E. G. Crandal,

Grapple.

No. 112,690. Patented Mar. 14, 1871.

Witnesses.
Chas. Kenyon.
Edwd. P. Mast.

Inventor.
E. G. Crandal,
Chipman Hosmer & Co
Attys.

UNITED STATES PATENT OFFICE.

EDWIN G. CRANDAL, OF BELFAST, NEW YORK.

IMPROVEMENT IN GRAPPLES.

Specification forming part of Letters Patent No. 112,690, dated March 14, 1871.

*To all whom it may concern:*

Be it known that I, EDWIN G. CRANDAL, of Belfast, in the county of Allegany and State of New York, have invented a new and valuable Improvement in Grapples; and I do hereby declare that the following is a full, clear, and exact description of the construction and operation of the same, reference being had to the annexed drawing, making a part of this specification, and to the letters and figures of reference marked thereon.

Figure 1:
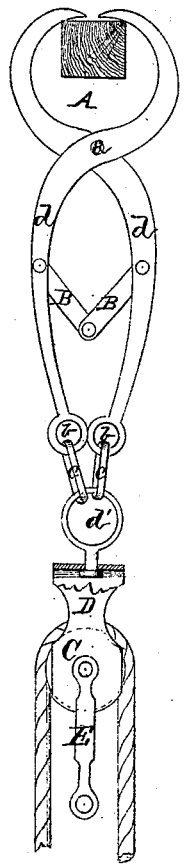
Figure 2:
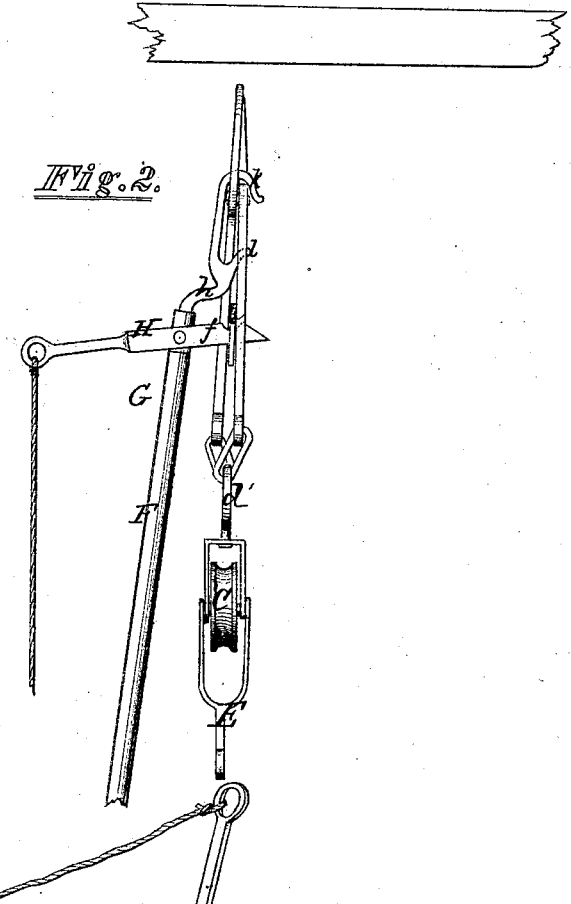
Figure 3:
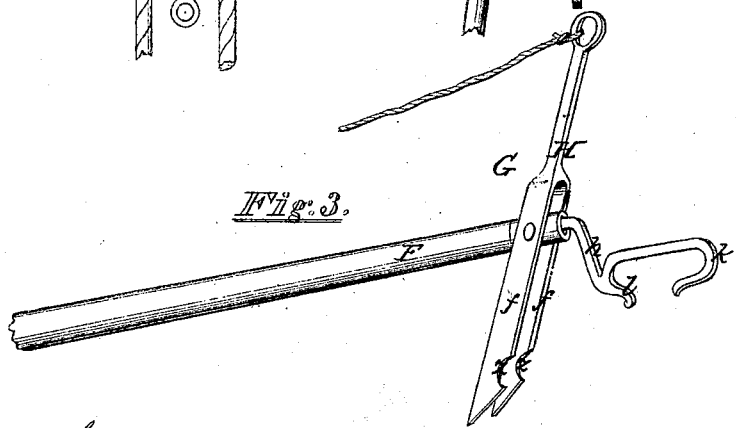

Figure 1 of the drawing is a side view of my invention. Fig. 2 is an end view of the same; Fig. 3, a perspective view of the adjusting-instrument.

My invention has relation to an improvement in grappling devices; and consists in the instrument devised for adjusting the grapple to a beam or rafter, and for removing the same without the necessity of a ladder.

The letter A of the drawing designates the grappling-iron. It consists of two hooks, pivoted together at $a$, and having eyes $b$ $b$ in the lever ends of the hooks. These lever ends are connected by the links $c$ $c$ and ring $d'$, and, by means of the spreading-arms B B, pivoted to each other and to the arms $d$ $d$ of the grapple at about their middle portion. The spreading-arms B B are bent downward, forming an elbow, where they are pivoted together, and their length bears such a relation to the length of the connecting-links $c$ and ring $d$ that they cannot be extended to their full length; consequently they must always form an angle with each other, which varies according to the degree of separation of the hooks of the grapple. From the ring $d$ is suspended, by a swivel-joint, the pulley C. D represents the sheave, and E designates a forked pendant, pivoted to the ends of the axle of the sheave outside of the cheeks of the pulley. In the end of the pendant E an eye is formed for the attachment of the draft-rope. F represents the elevating-pole of the adjusting-instrument G. To the upper end of this pole is attached a metal arm, $h$, which bends forward and then upward, terminating in a hook, $k$. Below the hook, and on the same side of the arm, is an upwardly-extending horn or projection, $l$. Near the upper end of the pole F is pivoted a forked lever, H, to the handle of which an operating-rope is attached. The tines $f$ of this forked lever extend forward on each side of the pole and in parallel directions. They are pointed at the end, and their upper edges are provided with corresponding notches $z$.

In using this instrument, the center of the grapple is placed in the recess formed by the hook $k$ and the horn $l$. The notches of the tines $f$ are then placed under the branches of the spreader. The grapple is now elevated, and the rope attached to the forked lever H pulled. This action spreads the hooks of the grapple apart. When it is brought into place, so that the hooks extend around the rafter, the rope is slackened and the hooks come together, securing the grapple.

What I claim as my invention, and desire to secure by Letters Patent, is—

The adjusting-instrument herein described, consisting of the elevating-pole F, recessed arm $h$, and forked lever H, provided with notched tines $f$, when constructed substantially as and for the purpose specified.

In testimony that I claim the above I have hereunto subscribed my name in the presence of two witnesses.

EDWIN G. CRANDAL.

Witnesses:
J. D. JACKSON,
L. E. CRANDALL.